(12) United States Patent
Reagan et al.

(10) Patent No.: US 7,460,759 B2
(45) Date of Patent: Dec. 2, 2008

(54) POST MOUNT FOR A FIBER DISTRIBUTION HUB

(75) Inventors: Randy Reagan, Clinton, MA (US); John Clifton Cobb, III, Fitchburg, MA (US); Tom Leblanc, Fitchburg, MA (US); Jeff Gniadek, Northbridge, MA (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 11/513,911

(22) Filed: Aug. 30, 2006

(65) Prior Publication Data

US 2007/0196070 A1   Aug. 23, 2007

Related U.S. Application Data

(60) Provisional application No. 60/712,147, filed on Aug. 30, 2005.

(51) Int. Cl.
*G02B 6/00* (2006.01)
(52) U.S. Cl. ...................... 385/135; 385/134
(58) Field of Classification Search ................ 385/134, 385/135
See application file for complete search history.

(56) References Cited

U.S. PATENT DOCUMENTS 3,466,380 A   9/1969   Baumgartner et al.
3,753,047 A   8/1973   Shallbetter
3,868,474 A   2/1975   Bunten
3,991,264 A   11/1976  Connell
4,099,354 A   7/1978   DePirro
4,234,756 A   11/1980  Jackula et al.
4,631,353 A   12/1986  Marks
4,884,863 A   12/1989  Throckmorton
5,117,067 A   5/1992   Jaycox
5,210,374 A   5/1993   Channell
5,261,024 A   11/1993  Allen et al.
6,198,041 B1  3/2001   Leschinger et al.
6,455,772 B1  9/2002   Leschinger et al.
6,598,949 B2  7/2003   Frazier et al.
2005/0207711 A1  9/2005  Vo et al.
2006/0193587 A1  8/2006  Wittmeier et al.

FOREIGN PATENT DOCUMENTS

JP   61-60975   3/1986

*Primary Examiner*—Jennifer Doan
(74) *Attorney, Agent, or Firm*—Merchant & Gould P.C.

(57) ABSTRACT

A post mount includes an outer body, an inner body, and a base. The outer body defines at least one aperture through which at least one fiber optic cable can enter the outer body. The inner body is configured to fit inside the outer body in a telescoping arrangement. The inner body is configured to move along a longitudinal axis relative to the outer body. The inner body defines a conduit extending longitudinally through the inner body. The conduit is configured to enable fiber cables to be routed through the conduit. The base is coupled to the inner body and is configured to secure and support a fiber distribution hub.

10 Claims, 6 Drawing Sheets

POST MOUNT FOR A FIBER DISTRIBUTION HUB

CROSS REFERENCE TO RELATED APPLICATIONS

This application claims priority from provisional application Ser. No. 60/712,147, filed Aug. 30, 2005, and which is incorporated herein by reference.

TECHNICAL FIELD

The principles disclosed herein relate to fiber optic cable systems. More particularly, the present disclosure relates to deployment of fiber distribution hubs and fiber optic cable systems.

BACKGROUND

Passive optical networks are becoming prevalent in part because service providers want to deliver high bandwidth communication capabilities to customers. Passive optical networks are a desirable choice for delivering high speed communication data because they may not employ active electronic devices, such as amplifiers and repeaters, between a central office and a subscriber termination. The absence of active electronic devices may decrease network complexity and/or cost and may increase network reliability.

Figure 1:
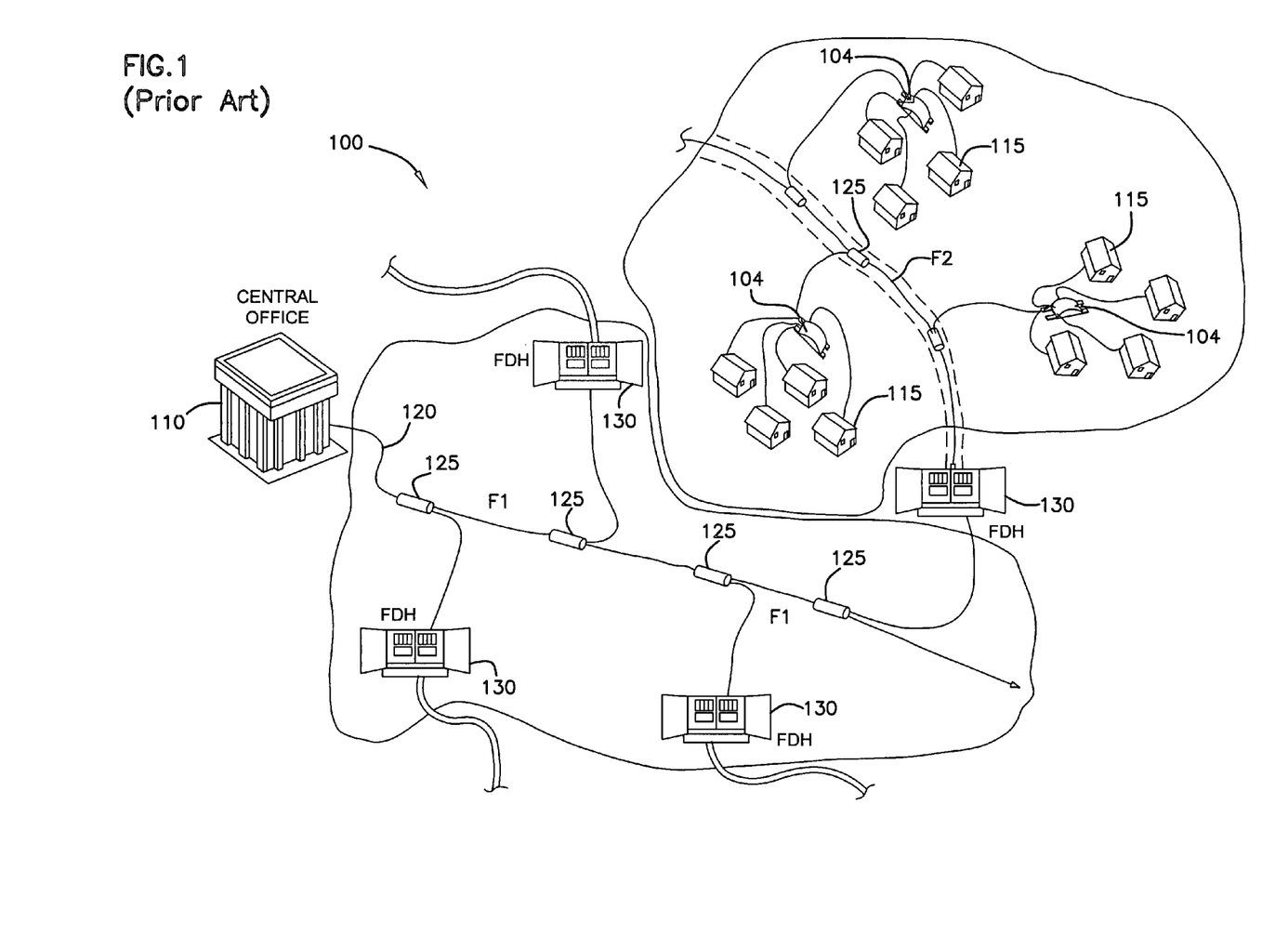
FIG. 1 shows a prior art passive fiber optic network.

FIG. 1 illustrates a network 100 deploying passive fiber optic lines. As shown, the network 100 can include a central office 110 that connects a number of end subscribers 115 (also called end users 115 herein) in a network. The central office 110 can additionally connect to a larger network such as the Internet (not shown) and a public switched telephone network (PSTN). The network 100 can also include fiber distribution hubs (FDHs) 130 having one or more optical splitters (e.g., 1-to-8 splitters, 1-to-16 splitters, or 1-to-32 splitters) that generate a number of individual fibers that may lead to the premises of an end user 115. The various lines of the network can be aerial or housed within underground conduits.

The portion of network 100 that is closest to central office 110 is generally referred to as the F1 region, where F1 is the "feeder fiber" from the central office. The F1 portion of the network may include a distribution cable having on the order of 12 to 48 fibers; however, alternative implementations can include fewer or more fibers. The portion of network 100 that includes an FDH 130 and a number of end users 115 can be referred to as an F2 portion of network 100. The network 100 includes a plurality of break-out locations 125 at which branch cables are separated out from main cable lines. Branch cables are often connected to drop terminals 104 that include connector interfaces for facilitating coupling the fibers of the branch cables to a plurality of different subscriber locations.

Fiber distribution hubs are frequently mounted on concrete pads or vaults that are installed in the ground to provide foundation for supporting the fiber distribution hubs. Concrete pads or vaults are particularly prevalent for systems where distribution cables are routed through underground conduits. Concrete pads or vaults typically are quite expensive and time consuming to install. Furthermore, special excavating equipment not typically carried by a cable technician is generally required to install concrete pads of vaults.

There exists a need in the art for better installation techniques of fiber distribution hubs.

SUMMARY

Certain aspects of the disclosure relate to fiber optic cable systems.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

DETAILED DESCRIPTION

Figure 2:
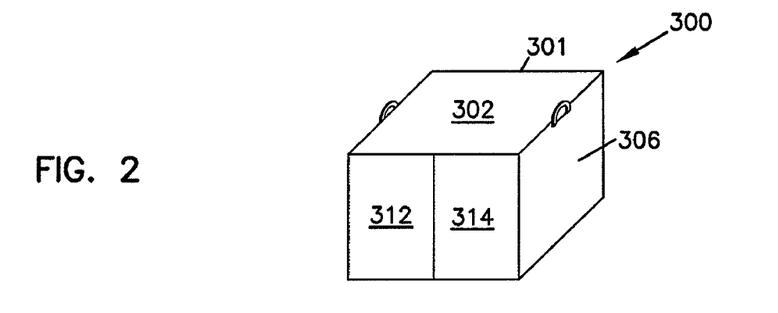
FIG. 2 is a perspective view of an example fiber distribution hub in a closed position.

Referring now to FIG. 2, an example fiber distribution hub (FDH) 300 is shown. FDH 300 generally administers connections between fiber optic cables and passive optical splitters in an Outside Plant (OSP) environment (see FIG. 1). FDH 300 provides an interconnect interface for optical transmission signals at a location in the network where operational access and reconfiguration are desired. For example, as noted above, FDH 300 can be used to splice one or more feeder cables, split the feeder cables, and terminate the split feeder cables to subscriber cables. In addition, the FDH 300 is designed to accommodate a range of alternative sizes and fiber counts and support factory installation of pigtails, fanouts and splitters.

Figure 3:
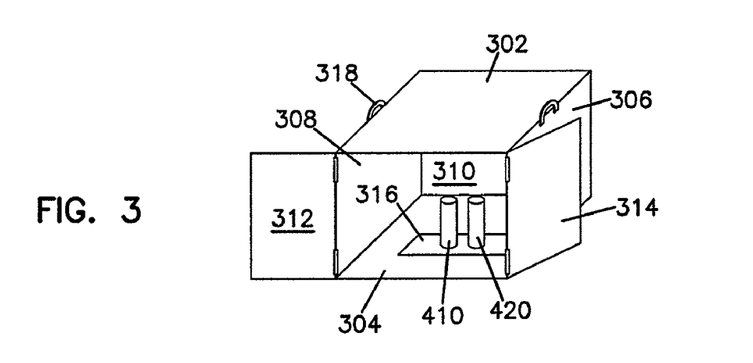
FIG. 3 is a perspective view of the example fiber distribution hub of FIG. 2 in an open position.

The FDH 300 includes a cabinet 301 that houses internal components, as described further below. As shown in FIG. 3, in one embodiment, the cabinet 301 includes a top panel 302, a bottom panel 304, a first side panel 306, a second side panel 308, a back panel 310, a first door 312, and a second door 314 (see FIG. 4). In addition, the cabinet 301 can include one or more carry handles 318 for facilitating deployment of cabinet 301 at a desired location. First and second doors 312, 314 are each pivotally mounted to facilitate access to components mounted within cabinet 301.

The FDH 300 includes a cable access region 316 (FIG. 3) through which a feeder cable 410 and a subscriber cable 420 can enter and exit the FDH 300. Typically, the cable access region 316 of the FDH 300 is defined in the bottom panel 304 when the FDH 300 is intended for vault-mounted applications and in the top panel 302 for aerial mounted applications.

Three sizes of the FDH 300 are typically available to correspond to three different subscriber cable fiber counts including, for example, 144, 216, and 432. Alternative sizes for the FDH 300 can be used without limitation. Embodiments of the FDH 300 can provide termination, splicing, interconnection, splitting, and combinations thereof.

The cabinet 301 of FDH 300 is typically manufactured from heavy gauge aluminum and is NEMA-4X rated. The cabinet 301 is configured to provide protection against rain, wind, dust, rodents and other environmental contaminants. At the same time, the cabinet 301 remains relatively lightweight for easy installation, and breathable to prevent accumulation of moisture in the unit. An aluminum construction with a heavy powder coat finish also provides for corrosion resistance. Other materials can be used.

Figure 4:
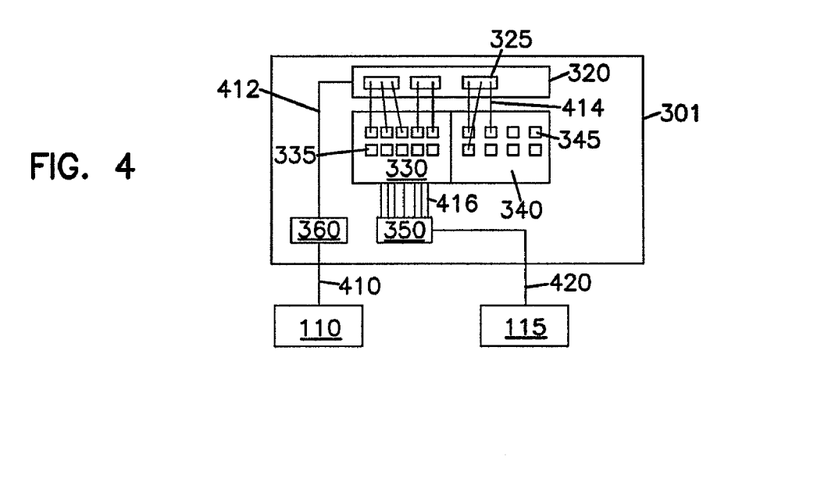
FIG. 4 is a schematic diagram showing an example cable routing scheme for the fiber distribution hub of FIG. 2.

Referring to FIG. 4, a feeder cable 410 is initially routed into the FDH 300 through the cable access region 316 (FIG. 3) of the cabinet 301. In certain embodiments, the fibers of the feeder cable 410 can include ribbon fibers. An example feeder cable 410 may include twelve to forty-eight individual fibers connected to a service provider central office 110 (FIG. 1). After entering the cabinet 301, the fibers of the feeder cable 410 are typically routed to a splitter region 320.

At the splitter region 320, the fibers of the feeder cable 410 are connected to separate splitters 325, at which each of the fibers can be split into multiple pigtails 414, each having connectorized ends. In other embodiments, however, the fibers of the feeder cable 410 can be routed to a feeder cable interface (e.g., a fiber optic adapter module, a splice tray, etc.) 360. At the feeder cable interface 360, one or more of the fibers of the feeder cable 410 are individually connected to separate splitter input fibers 412 that are routed to the splitter region 320.

When the splitter pigtails 414 are not in service, the connectorized ends can be temporarily stored on one or more storage receptacles 345 mounted at a storage region 340. When the pigtails 414 are needed for service, the pigtails 414 are routed from the splitters 325 to subscriber termination adapters 335 provided at a termination region 330. At the termination region 330, the pigtails 414 are connected to the fibers of a subscriber cable 420 or to an intermediary cable optically coupled to the subscriber cable 420. The termination region 330, therefore, is the dividing line between the incoming fibers and the outgoing fibers. A typical subscriber cable 420 forms the F2 portion of a network (see FIG. 1) and typically includes a plurality of fibers (e.g., 144, 216 or 432 fibers) that are routed from the FDHs to subscriber locations 115 (FIG. 1).

In some embodiments, one or more of the fibers of the feeder cable 410 are not connected to any of the splitters 325, but rather connect through an interface device to pass-through fibers, which connect to the fibers of the subscriber cable 420 at the termination region 330. By refraining from splitting a fiber of the feeder cable 410, a stronger signal can be sent to one of the subscribers 115. The connectorized ends of the pass-through fibers (not shown) can be stored at the storage region 340 when not in use. In other embodiments, however, a feeder cable 410 having a connectorized end can be routed directly to the termination region 330.

The fibers of the feeder cable 410 can be protected within the cabinet 301 by loose buffer tubes. In certain embodiments, the fibers of the feeder cable 410 can include ribbon fibers. Fan-out blocks can be provided at suitable locations within the cabinet 301 to separate and join the ribbon fibers. Spools, clips, holders, brackets or other cable management structures can also be provided within the cabinet 301 to facilitate managing the fibers 410, 412, 414, 420 routed within of the FDH 300.

In certain embodiments, the splitter region 320, the termination region 330, and the storage region 340 can be located on a swing frame mounted within the cabinet 301. In some embodiments, the termination region 330 can be fully loaded with adapters and pre-terminated in the factory with a stub cable 416 containing 144 fibers, 216 fibers or 432 fibers. At the factory, connectorized ends of the stub cable fibers 416 are inserted into the back sides of the adapters of the termination region 330. The other ends of the stub cable fibers 416 can be spliced or otherwise connected in the field at a coupling location 350 to the fibers of the subscriber distribution cable 420. The subscriber cable 420 can then be routed from the FDH to subscriber locations.

Additional details regarding example fiber distribution hubs similar to FDH 300 can be found in U.S. patent application Ser. No. 11/203,157 filed on Aug. 15, 2005 and issued as U.S. Pat. No. 7,369,741 on May 6, 2008, the entirety of which is hereby incorporated by reference.

Figure 5:
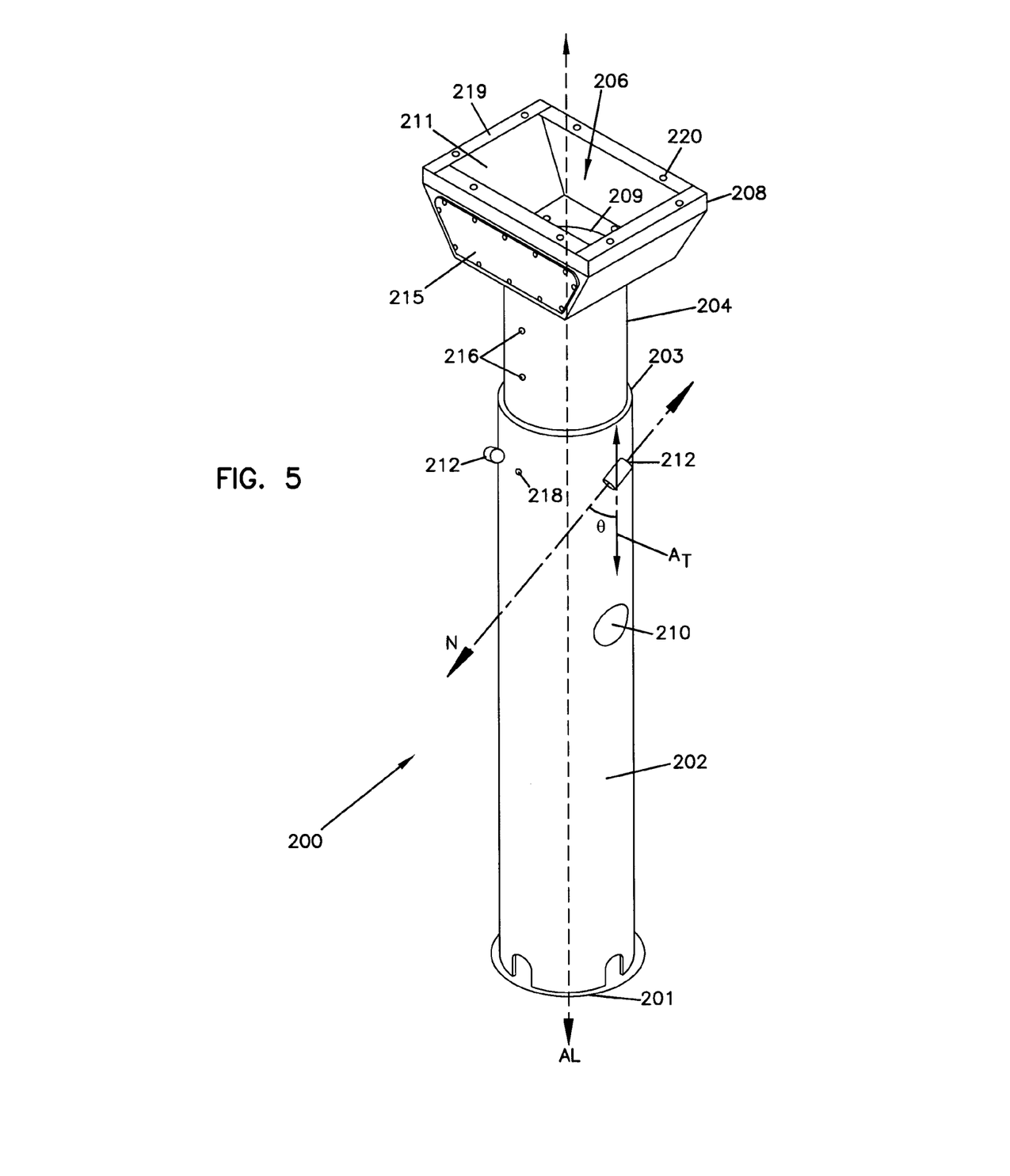
FIG. 5 is an example post mount having features that are examples of inventive aspects in accordance with the principles of the present disclosure.

Referring now to FIG. 5, an example post mount 200 having features that are examples of inventive aspects in accordance with the principles of the present disclosure is shown. The post mount 200 includes an outer body 202 extending from a first end 201 to a second end 203. The outer body 202 defines at least one aperture 210 through which one or more fiber optic cables can pass to reach the FDH 300. In one example embodiment, the outer body 202 defines two apertures 210 on opposite sides of the outer body 202 (e.g., see FIG. 9).

Figure 7:
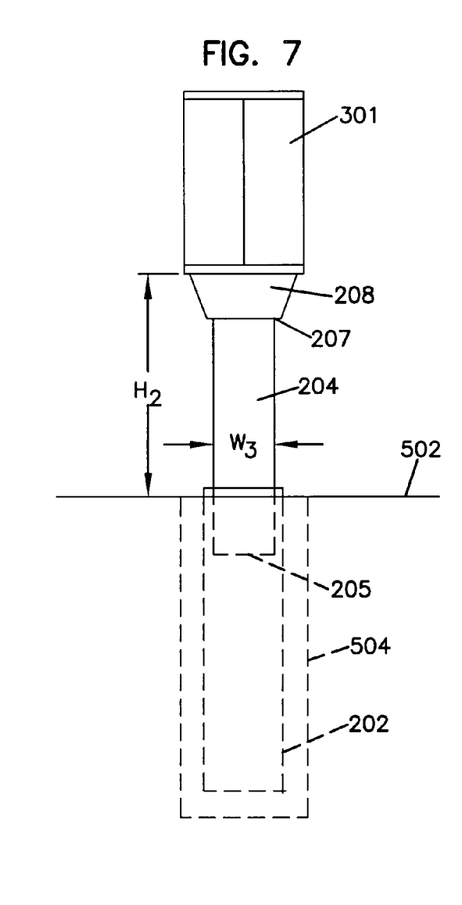
FIG. 7 shows the post mount of FIG. 6 arranged in a lengthened position.

The post mount 200 also includes an inner body 204 extending from a first end 205 to a second end 207 (e.g., see FIG. 7). The inner body 204 is configured to fit within the outer body 202 in a telescoping configuration. Typically, the second end 207 of the inner body 204 protrudes from the second end 203 of the outer body 202. The inner body 204 defines a conduit 206 (FIG. 5) through which fiber optic cable can travel between the aperture 210 in the outer body 202 and the FDH 300 (e.g., see FIG. 9). In one embodiment, the outer body 202 and inner body 204 are cylindrical.

A base 208 on which the FDH 300 can mount is coupled to the second end 207 of the inner body 204. The base 208 includes side panels 211 extending from an aperture 209 leading to the conduit 206 (FIG. 5). Flanges 219 extend from the ends of the side panels 211 (FIG. 5). In one embodiment, the ends of the side panels 211 can be bent over to form the flanges 219. The flanges 219 can be welded at the seams to provide stability. In some embodiments, the flanges 219 form a generally rectangular shape. In other embodiments, however, the flanges 219 can form any desired shape.

The floor of the FDH 300 can be fastened (e.g., bolted) to a first side of the flanges 219 through holes 220 provided in the flanges 219. The floor of the FDH 300 also can define holes in alignment with the holes 220 in the flanges 219. To aid in fastening the FDH 300 to the base 208, one of the side panels 211 defines an opening sized to enable access to the opposite side of the flanges 219 during installation of the FDH 300. The opening also can provides access to the fiber splice/interconnect locations, such as locations 350, 360 (FIG. 4). A removable access door 215 (FIGS. 5 and 8) covers the opening in the side panel 211.

Figure 6:
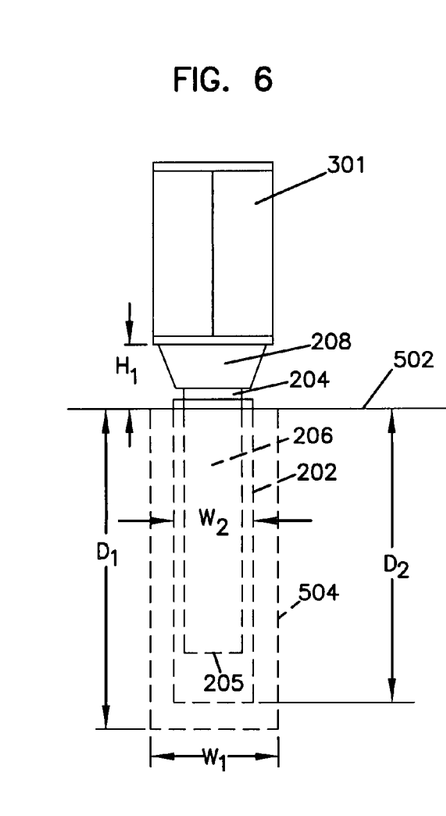
FIG. 6 shows the post mount of FIG. 5 installed in the ground and arranged in a shortened position.

Referring now to FIGS. 6-9, the post mount 200 can be installed in the ground and coupled to an optical network. To install the post mount 200, a hole 504 having a depth D1 and a width W1 is dug in the ground 502 (FIG. 6). Generally, the depth of the hole 504 ranges from about five feet to about seven feet. The width W1 of the hole 504 generally ranges from about sixteen inches to about twenty inches. In a preferred embodiment, the hole 504 has a depth D1 of about six feet and a width W1 of about eighteen inches.

In certain embodiments, the hole 504 is excavated using a pole-hole auger (not shown). A pole-hole auger generally has a rotating helical shaft configured to bore into the ground. Such an auger is typically used to install telephone poles. Trucks used by the telecommunications industry can be configured to carry such an auger to deployment sites. The auger enables telecommunications workers to channel into the ground quickly and easily to prepare the installation site.

The post mount 200 can be inserted into and buried in the hole 504 (e.g., see FIG. 6). The outer body 202 of the post mount 200 extends into the hole 504 by a depth D2 generally ranging from about five and one-half feet to about six and one-half feet. The outer body 202 also has a width W2 ranging from about fourteen inches to about eighteen inches. In a preferred embodiment, the outer body 202 has a depth D2 of about seventy inches and a width W2 of about sixteen inches.

In certain embodiments, the inner body 204 can be moved relative to the outer body 202 of the post mount 200. For example, the inner body 204 can be moved in either direction along a longitudinal axis AL (FIG. 5) relative to the outer body 202. In such embodiments, the post mount 200 generally includes a fastening system (best seen in FIG. 8) for locking the inner body 204 at one of multiple positions with respect to the outer body 202. For example, the inner body 204 and the outer body 202 can include peg holes 216, 218, respectively (FIG. 5). A pin 217 (FIG. 8) or other fastener can be inserted into a set of aligned peg holes 216, 218 to set the inner body 204 at a desired position with respect to the outer body 202.

Using the fastening system 216-218, the FDH 300 can be positioned at different levels above the ground 502 to accommodate the surrounding environment. For example, a FDH 300 is typically arranged at a height H1 of about twelve inches from the ground 502 (FIG. 6). In a flood prone area, however, the inner body 204 can be arranged to raise the FDH 300 to a height $H_2$ of about 30-inches from the ground 502 (see FIG. 7). In other embodiments, the outer and inner bodies 202, 204 can be arranged to position the FDH 300 at any desired height.

Figure 8:
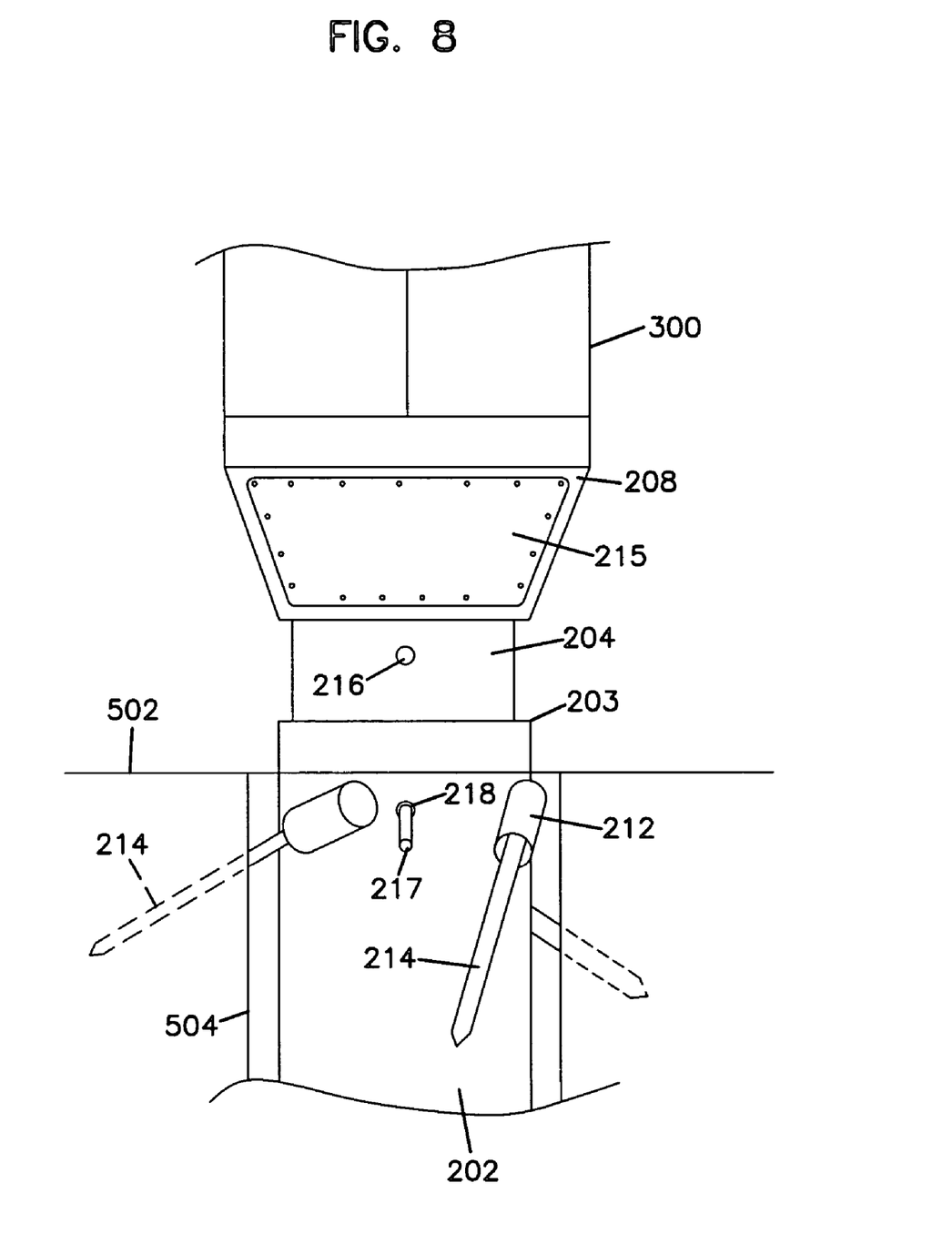
FIG. 8 is a partial view of the post mount of FIG. 5 installed in the ground and on which anti-rotational stakes are visible.

Referring to FIG. 8, stake supports 212 can also be attached to the outer body 202 adjacent the second end 203 to inhibit rotation of the post mount 200 about the longitudinal axis $A_L$. In one example embodiment, three stake supports 212 are positioned at equidistant points about the outer body 202. The stake supports 212 are configured to retain stakes 214 for anchoring the post mount 200 into the ground 502. The stakes are sufficiently long to extend from the outer body 202, to the edge of the hole 404, and into the ground 502 a distance sufficient to fix the post mount 200 in a particular orientation.

In general, the stake supports 212 are arranged tangentially to the outer body 202. In certain embodiments, the stake supports 212 are angled downwardly at an angle θ (FIG. 5) with respect to axes $A_T$ extending longitudinally along the surface of the outer body 202 (see FIG. 5). In some embodiments, the angle θ ranges from about 10-degrees to about 60-degrees. Typically, the angle θ is about 45 degrees. In other embodiments, however, the stake supports 212 can be arranged at any desired angle θ.

Figure 9:
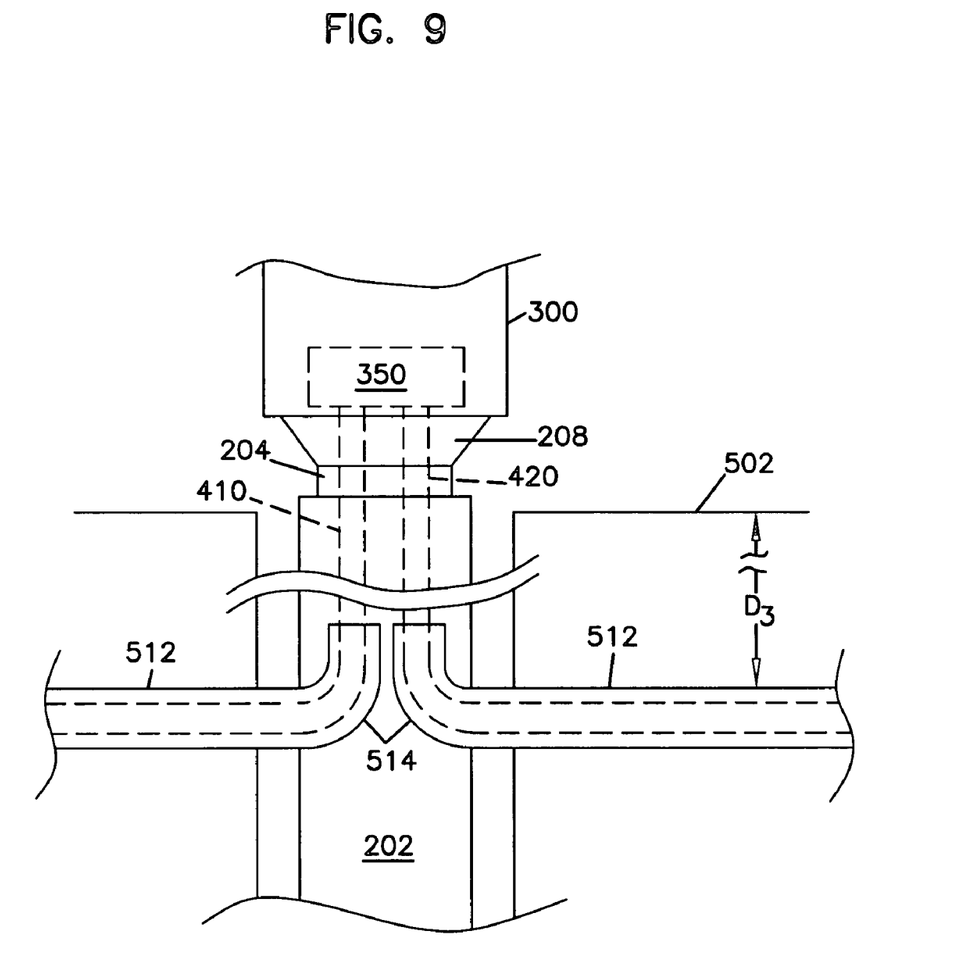
FIG. 9 is a partial schematic view of the post mount of FIG. 5 showing fiber optic cables extending through conduits to enter and exit the fiber distribution hub through the post mount.

FIG. 9 is a partial view of the post mount 200 showing the routing of fiber cables from conduits 512 to an FDH 300. The stake supports 212 have been removed for ease in viewing. Generally, the conduits 512 are installed in underground channels. Typically, the conduits are installed in the ground 502 at a depth D3 from ground level at approximately the same time the post mount 200 is being installed. The depth D3 can range from about one foot to about three feet. In a preferred embodiment, the depth D3 is about two feet.

In some embodiments, the conduits 512 terminate at the perimeter of the hole 504. In one such embodiment, the conduits 512 terminate in funnel-shaped end pieces. In other embodiments, the conduits 512 extend into the post mount 200 through the apertures 210. For example, as shown in FIG. 9 the conduits 512 can include elbow-shaped sections 514 located within the post mount 200, to guide the cables 410, 420 into the FDH 300 without bending the cables 410, 420 beyond a minimum bend radius.

The fiber optic cables 410, 420 extend from the conduits 512 up through the passageway 206 defined within the inner body 204 of the post mount 200 to the FDH 300. In certain embodiments, the cables 410, 420 can be spliced or otherwise coupled to pre-loaded stub cables 412, 416, respectively, at the coupling location 350.

From the forgoing detailed description, it will be evident that modifications and variations can be made in the devices of the disclosure without departing from the spirit or scope of the invention.

What is claimed is:

1. A post mount comprising:
   an outer body extending from a first end to a second end, the outer body defining at least one aperture through which at least one fiber optic cable can enter the outer body;
   an inner body configured to fit inside the outer body in a telescoping arrangement, the inner body configured to move along a longitudinal axis relative to the outer body, the inner body defining a conduit extending longitudinally through the inner body, the conduit configured to enable the at least one fiber optic cable to be routed through the conduit;
   a base coupled to the inner body, the base configured to secure and support a fiber distribution hub a distance above ground;
   a fastening system configured to secure the inner body at one of a plurality of vertical positions with respect to the outer body, the fastening system including a plurality of vertically spaced-apart fastener holes defined in the inner body and at least one fastener hole defined in the outer body, the fastening system also including at least one fastener that inserts through the at least one fastener hole of the outer body and a selected one of the fastener holes of the inner body; and
   the fastening system allowing the distance of the fiber distribution hub above the ground to be set to a desired height.

2. The post mount of claim 1, further comprising a plurality of stake supports coupled to the outer body, the stake supports configured to hold stakes to maintain the orientation of the post mount.

3. The post mount of claim 2, wherein the plurality of stake supports includes three stake supports spaced circumferentially about the outer body.

4. The post mount of claim 3, wherein each stake support is oriented at an angle with respect to a longitudinal axis of the outer body.

5. The post mount of claim 4, wherein each stake support is oriented at about a forty-five degree angle with respect to the longitudinal axis.

6. The post mount of claim 1, wherein the outer body has a length of about seventy inches.

7. The post mount of claim 1, wherein the outer body has a width of about sixteen inches.

8. The post mount of claim 1, wherein the base includes an access panel.

9. post mount of claim 1, wherein the outer body is generally cylindrical.

10. The post mount of claim 1, wherein the desired height ranges from twelve inches to thirty inches.

* * * * *

UNITED STATES PATENT AND TRADEMARK OFFICE
CERTIFICATE OF CORRECTION

| | | |
|---|---|---|
| PATENT NO. | : 7,460,759 B2 | Page 1 of 1 |
| APPLICATION NO. | : 11/513911 | |
| DATED | : December 2, 2008 | |
| INVENTOR(S) | : Reagan et al. | |

It is certified that error appears in the above-identified patent and that said Letters Patent is hereby corrected as shown below:

On the Title Page

Item (75) Inventors: "Tom Leblanc," should read --Thomas Leblanc,--

Signed and Sealed this
Sixteenth Day of December, 2014

Michelle K. Lee
*Deputy Director of the United States Patent and Trademark Office*